(12) United States Patent
Roth et al.

(10) Patent No.: US 8,856,957 B1
(45) Date of Patent: Oct. 7, 2014

(54) FEDERATED IDENTITY BROKER

(75) Inventors: Gregory B. Roth, Seattle, WA (US);
Kevin Ross O'Neill, Seattle, WA (US);
Eric Jason Brandwine, Haymarket, VA
(US); Eric D. Crahen, Seattle, WA
(US); Cristian M. Ilac, Sammamish,
WA (US)

(73) Assignee: Amazon Technologies, Inc., Reno, NV (US)

( * ) Notice: Subject to any disclaimer, the term of this patent is extended or adjusted under 35 U.S.C. 154(b) by 16 days.

(21) Appl. No.: 13/334,490

(22) Filed: Dec. 22, 2011

(51) Int. Cl.
*G06F 1/26* (2006.01)
*H04L 29/06* (2006.01)

(52) U.S. Cl.
USPC ............................................ 726/28; 713/155

(58) Field of Classification Search
USPC .......... 726/27, 28, 29, 26; 713/154, 155, 156, 713/157; 705/35, 14
See application file for complete search history.

(56) References Cited

U.S. PATENT DOCUMENTS

| | | | | | |
|---|---|---|---|---|---|
| 5,855,008 | A | * | 12/1998 | Goldhaber et al. | 705/14.1 |
| 7,356,503 | B1 | * | 4/2008 | Johnson et al. | 705/38 |
| 7,428,750 | B1 | * | 9/2008 | Dunn et al. | 726/8 |
| 7,734,522 | B2 | * | 6/2010 | Johnson et al. | 705/35 |
| 7,764,677 | B2 | * | 7/2010 | Koehler et al. | 370/389 |
| 7,966,652 | B2 | * | 6/2011 | Ganesan | 726/4 |
| 8,683,602 | B2 | * | 3/2014 | Waller et al. | 726/26 |
| 2005/0055294 | A1 | * | 3/2005 | Mustier | 705/35 |
| 2006/0064502 | A1 | * | 3/2006 | Nagarajayya | 709/237 |
| 2006/0136990 | A1 | * | 6/2006 | Hinton et al. | 726/2 |
| 2007/0208711 | A1 | * | 9/2007 | Rhoads et al. | 707/3 |
| 2007/0220268 | A1 | * | 9/2007 | Krishnaprasad et al. | 713/182 |
| 2007/0263820 | A1 | * | 11/2007 | Czyszczewski et al. | 379/201.12 |
| 2008/0069102 | A1 | * | 3/2008 | Koehler et al. | 370/392 |
| 2009/0138366 | A1 | * | 5/2009 | Bemmel et al. | 705/17 |
| 2009/0164313 | A1 | * | 6/2009 | Jones et al. | 705/14 |
| 2009/0313467 | A1 | * | 12/2009 | Atkins et al. | 713/155 |
| 2009/0319781 | A1 | * | 12/2009 | Byrum et al. | 713/156 |
| 2010/0250955 | A1 | * | 9/2010 | Trevithick et al. | 713/185 |
| 2010/0275009 | A1 | * | 10/2010 | Canard et al. | 713/155 |
| 2011/0016214 | A1 | * | 1/2011 | Jackson | 709/226 |
| 2011/0022417 | A1 | * | 1/2011 | Rao | 705/4 |
| 2011/0040967 | A1 | * | 2/2011 | Waller et al. | 713/161 |
| 2011/0088099 | A1 | * | 4/2011 | Villani et al. | 726/27 |
| 2011/0166918 | A1 | * | 7/2011 | Allaire et al. | 705/14.7 |
| 2012/0017884 | A1 | * | 1/2012 | Van Den Hoff et al. | 126/25 R |
| 2012/0078727 | A1 | * | 3/2012 | Lee | 705/14.66 |
| 2012/0084151 | A1 | * | 4/2012 | Kozak et al. | 705/14.58 |
| 2012/0117626 | A1 | * | 5/2012 | Yates et al. | 726/4 |
| 2012/0158821 | A1 | * | 6/2012 | Barros | 709/203 |
| 2012/0254602 | A1 | * | 10/2012 | Bhansali et al. | 713/2 |
| 2012/0254957 | A1 | * | 10/2012 | Fork et al. | 726/6 |
| 2012/0271715 | A1 | * | 10/2012 | Morton et al. | 705/14.53 |
| 2012/0278876 | A1 | * | 11/2012 | McDonald | 726/9 |
| 2013/0017884 | A1 | * | 1/2013 | Price et al. | 463/25 |
| 2013/0023339 | A1 | * | 1/2013 | Davis et al. | 463/29 |
| 2013/0024350 | A1 | * | 1/2013 | Hughes et al. | 705/37 |
| 2013/0081111 | A1 | * | 3/2013 | Geller | 726/4 |

OTHER PUBLICATIONS

Wang Bin et al, Open identity management framework for SaaS Ecosystem, IEEE, 2009, p. 512-517.*

* cited by examiner

*Primary Examiner* — Abu Sholeman
(74) *Attorney, Agent, or Firm* — Thomas | Horstemeyer, LLP (57) ABSTRACT

A federated identity system is described. A federated identity broker registers a first customer as an identity provider and a second customer as an identity consumer. The federated identity broker acts as an intermediary between the first customer and the second customer, to broker an identity request from the first customer that is fulfilled by the second customer.

16 Claims, 4 Drawing Sheets

FEDERATED IDENTITY BROKER

BACKGROUND

Many web sites and web services require a registration process in which a user creates an account before using some or all of the features of the web site or service. As the number of available web sites and web services grows, so does the number of accounts which a user must track and maintain.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to managing the identity of computer users, and specifically to federated identity management. By requiring a user to have an identity, computer systems can ensure that only authenticated users are allowed access to protected resources. In a federated identity system, the process of managing user identity is distributed across multiple entities rather than being centrally managed. A federated system includes two basic roles: identity providers and identity consumers. A system protects a resource by requiring authentication of an identity before allowing access to the resource. A resource owner thus acts as an identity consumer. An end user establishes an identity with one or more identity providers. The resource owner/identity consumer then interacts with the identity provider to authenticate the user's identity. Once the user's identity has been authenticated, the resource owner grants access to the resource.

The basic system described above requires each identity provider and identity consumer to have a pre-negotiated relationship. The basic system does not scale effectively as the number of providers and consumers grows, since N providers and M consumers would require N×M pre-negotiated relationships. Embodiments described herein utilize a federated identity broker which operates as a middleman between an identity provider and an identity consumer. Service providers, such as web services, establish a customer relationship with the federated identity broker. A particular service provider X can then allow any of the broker's other customers (e.g., service providers Y and Z) to access X's services, without requiring a per-relationship configuration for Y and Z. The trust is instead established transitively: each service provider trusts the broker and relies on the broker to manage the upstream and downstream relationship. In the following discussion, a general description of the system and its components is provided, followed by a discussion of the operation of the same.

Figure 1:
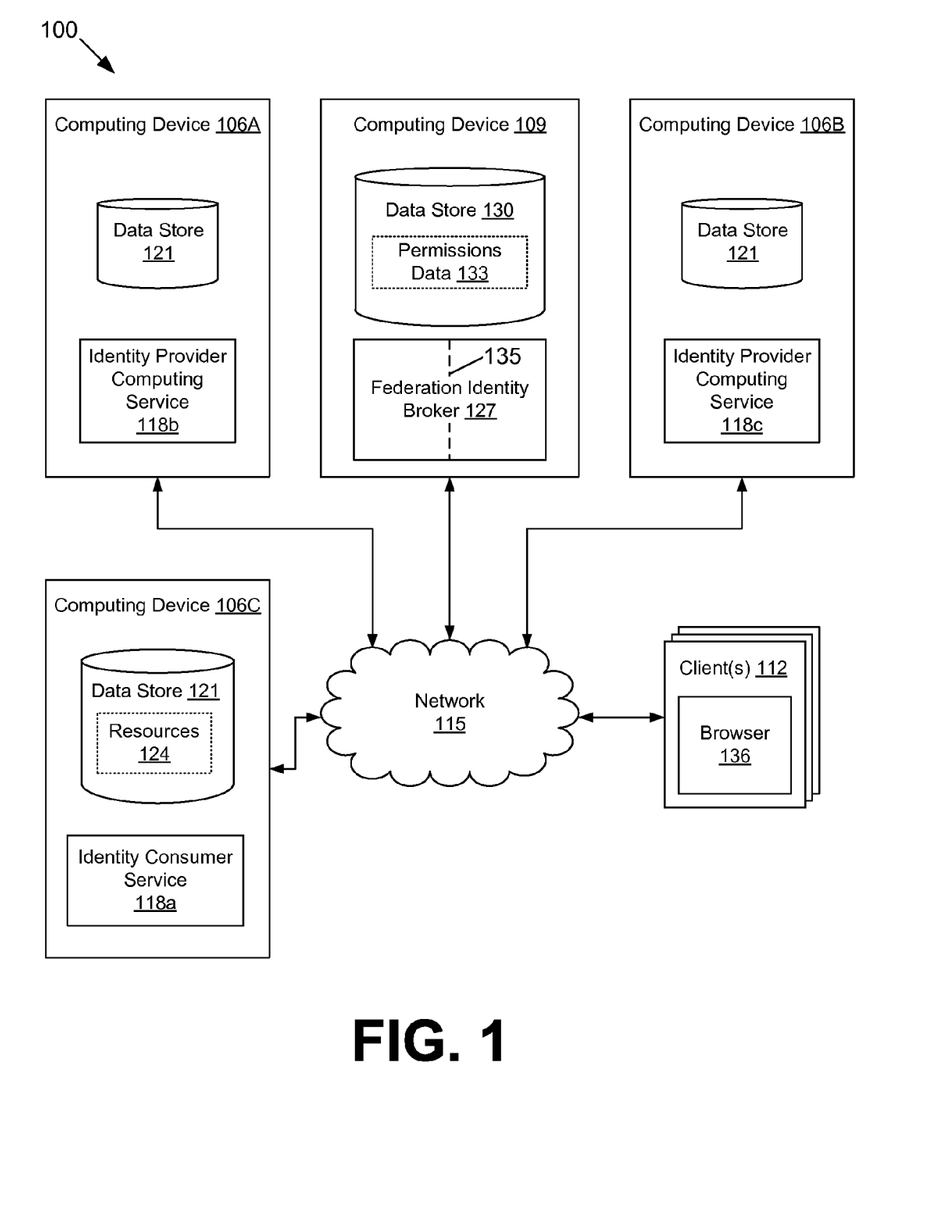
FIG. 1 is a drawing of a networked environment according to one embodiment of the present disclosure.

With reference to FIG. 1, shown is a networked environment 100 according to various embodiments. The networked environment 100 includes one or more computing devices 106A . . . 106C, one or more computing devices 109 and one or more client devices 112 by way of the network 115. The computing devices 106, the computing device 109, and the client device 112 are in data communication by way of a network 115. The network 115 includes, for example, the Internet, intranets, extranets, wide area networks (WANs), local area networks (LANs), wired networks, wireless networks, or other suitable networks, or any combination of two or more such networks.

Each computing device 106 may comprise, for example, a server computer or any other system providing computing capability. Alternatively, a plurality of computing devices 106 may be employed that are arranged, for example, in one or more server banks or computer banks or other arrangements. A plurality of computing devices 106 together may comprise, for example, a network-based computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in various arrangements.

Various applications and/or other functionality may be executed in each of the computing devices 106 according to various embodiments. The components executed on the computing device 106A, B, C may include, for example, a computing service 118a, b, c, respectively. A computing service 118 is executed to provide a service to end users, to provide a service to other computing services, and/or to provide a service to other computing services on behalf of end users. These services may vary widely, including web sites with user interaction, application program interfaces (APIs) which are used programmatically by other programs or services, or combinations thereof. The implementation of a computing service 118 may take many forms, including, for example, a web service. A representative list of computing services 118 includes a photo sharing service, a social networking service, an email service, a storage service, a map service, a weather report service, a music service, and others as can be appreciated. The computing devices 106 may also execute other applications, services, processes, systems, engines, or functionality not discussed in detail herein.

Various data is stored in a data store 121 that is accessible to each respective computing device 106. The data store 121 may be representative of a plurality of data stores as can be appreciated. The data stored in the data store 121, for example, is associated with the operation of the various applications and/or functional entities of the computing device 106 as described herein.

The computing device 109 may comprise, for example, a server computer or any other system providing computing capability. Alternatively, a plurality of computing devices 109 may be employed that are arranged, for example, in one or more server banks or computer banks or other arrangements. A plurality of computing devices 109 together may comprise, for example, a network-based computing resource, a grid computing resource, and/or any other distributed computing arrangement. Such computing devices 109 may be located in a single installation or may be distributed among many different geographical locations. For purposes of convenience, the computing device 109 is referred to herein in the singular. Even though the computing device 109 is referred to in the singular, it is understood that a plurality of computing devices 109 may be employed in various arrangements.

Various applications and/or other functionality may be executed in the computing device 109 according to various embodiments. The components executed on the computing device 109 include, for example, a federated identity broker 127 and other applications, services, processes, systems, engines, or functionality not discussed in detail herein. Also, various data is stored in a data store 130 that is accessible to the computing device 109. The data store 130 may be representative of a plurality of data stores as can be appreciated. The data stored in the data store 130, for example, is associated with the operation of the various applications and/or functional entities of the computing device 109 as described herein. The data stored in the data store 130 includes, for example, permission data 133 and potentially other data.

The federated identity broker 127 operates as an identity intermediary or broker between computing services 118. The networked environment 100 includes at least one identity consumer computing service 118a and at least two identity provider computing services 118b and 118c. When appropriate, the role-specific terms "identity consumer computing service 118a" and "identity provider computing services 118a, b" will generally be used hereinafter rather than the more generic term "computing service 118."

The federated identity broker 127 acts as a broker between a particular identity consumer computing service 118a and a selected one of the identity provider computing services 118b, c. To this end, an identity consumer computing service 118a may, through the federated identity broker 127, request access to a resource 124 stored in the data store 121 of another computing service 118. A resource 124 may correspond to a file, but other types of resources are supported as can be appreciated. More specifically, an identity consumer computing service 118a acting on behalf of a particular end user may, through the federated identity broker 127, request access to a resource 124, or part of a resource that is associated with another computing service 118 and owned by the same end user. This brokering process will be described in further detail below. Some embodiments of the federated identity broker 127 also provide permission scoping services, by which an end user can limit the type access which one computing service 118 has to the resources 124 of another computing service 118. The federated identity broker 127 may store information about these permissions as permission data 133. This scoping process will be described in further detail below.

Having discussed the computing device 109 and the computing device 106, the client device 112 will now be considered. The client device 112 is representative of a plurality of client devices that may be coupled to the network 115. The client device 112 may comprise, for example, a processor-based system such as a computer system. Such a computer system may be embodied in the form of a desktop computer, a laptop computer, a personal digital assistant, a cellular telephone, a smart phone, a set-top box, a television, a music player, a video player, a media player, a web pad, a tablet computer system, a game console, an electronic book reader, or other devices with like capability. The client device 112 may be configured to execute various applications such as a browser 136. The browser 136 may be executed in the client device 112, for example, to access and render network pages, such as web pages, or other network content served up by a server, thereby generating a rendered content page on a display of the client device 112. Alternatively, a dedicated application may be executed on the client device 112 that facilitates the rendering of network content. The client device 112 may be configured to execute applications beyond the browser 136 such as, for example, email applications, messaging applications, and/or other applications.

Next, a general description of the operation of the various components of the networked environment 100 is provided. The operation will be described in terms of use cases or scenarios, but the techniques described herein apply to a variety of other use cases. To begin, a computing service 118a registers as a customer with the federated identity broker 127, specifying that the registration is for an identity consumer rather than an identity provider. The computing service 118a and the federated identity broker 127 may exchange other types of information during the registration process, as can be appreciated. The federated identity broker 127 stores this service-specific information in the data store 130 for later use in the brokering process.

Some embodiments of the federated identity broker 127 may provide the identity consumer computing service 118a with a list of possible identity providers that are customers of the federated identity broker 127. The identity consumer computing service 118a then specifies which of those supported identity providers are acceptable to, or trusted by, the computing service 118a. In this manner, each computing service 118 trusts the federated identity broker 127 and the federated identity broker 127 manages the trust relationship with the other computing service 118 involved in the transaction.

The identity consumer computing service 118a may rely on the end user to make a choice between identity providers, or may make the choice without explicit user input. In some embodiments of the federated identity broker 127, the federated identity broker 127 does not provide a list of providers, but provides instead a list of identity standards and/or levels of assurance. The identity consumer computing service 118a may rely on the end user to make a choice between identity standards, or may make the choice without explicit user input. One example of an identity standard is National Institute of Science and Technology (NIST) 800-63, though the embodiments described herein may use other standards as should be appreciated. NIST 800-63 defines several levels of assurance, for example, Level 1 (least assurance) through Level 4 (most assurance).

The federated identity broker 127 may also assign its own level of trust or level of assurance, based on the identity provider computing service 118a, b meeting various selection criteria. As one example, one selection criteria may be the provider's number of customers. In such a case, the federated identity broker 127 may assign providers with more than 100,000 customers the highest level of assurance, assign providers with more than 1,000 but less than 100,000 customers an intermediate level of assurance, and assign providers with 1,000 customers of less the lowest level of assurance.

As another example, one selection criteria enforced by the federated identity broker 127 may be a requirement that the identity provider have an Extended Validation Secure Sockets Layer (SSL) Certificate. Yet another example of a selection criteria enforced by the federated identity broker 127 may be a requirement that the identity provider have published an International Standards Organization (ISO) 27001 audit statement.

The entity operating the federated identity broker 127 may require that the entity operating the identity provider computing service 118a, b provide proof that these requirements are met, in the form of digital or written documentation. In this manner, an identity provider computing service 118a, b attests to compliance with a level of assurance criteria and the federated identity broker 127 verifies the compliance. The identity consumer computing service 118a trusts the federated identity broker 127, and by extension, trusts the identity provider computing service 118a, b.

After at least one service has registered with the federated identity broker 127 as an identity consumer and at least two services have registered with the federated identity broker 127 as identity providers, the federated identity broker 127 is ready to act as an intermediary between two parties. Such brokering is involved when an end user interacts with a computing service 118 and the computing service 118 accesses resources 124 on behalf of the end user, since access to private resources requires some sort of identity authentication. In order to create or access such a resource, an end user may be required to obtain an identity or account from the computing service 118 which provides access to the resource. Information provided by the end user during this registration process may be stored by the computing service 118 as user account data.

As one example of accessing a computing service resource, the end user may upload photos or download music through the identity consumer computing service 118a. To do so, the end user signs in at the identity consumer computing service 118a. In this example scenario, the identity consumer computing service 118a is a web site that allows users to view and post photos of cats (known as "Cat Pics"). As noted earlier, the identity consumer computing service 118a is a customer of the federated identity broker 127, as are one or more identity providers 118b, c. Therefore, when signing in at the identity consumer computing service 118a, the end user is not limited to credentials that are specific to the computing service 118a, but may instead use credentials supported by any identity provider that is also a customer of the federated identity broker 127. In this example scenario, the federated identity broker 127 has three different identity providers as its customers (Google®, Facebook®, and Twitter®), and the end user signs in to the "Cat Pics" web site with his Google® account. During this sign-in process, the federated identity broker 127 acts as a middleman between the identity consumer computing service 118a having the role of identity consumer ("Cat Pics") and the identity provider computing service 118b or 118c having the role of identity provider (Google®, as selected by the end user).

In some scenarios, the end user may desire to have his credential information kept private and not shared with the identity consumer computing service 118a. This may be accomplished by redirecting the identity request to the identity provider computing service 118b or 118c, where the redirection mechanism includes information describing the user account. The identity provider computing service 118b or 118c then authenticates the user and redirects the request back to the identity consumer computing service 118a, where the redirection mechanism includes information indicating that the user has been successfully authenticated. In this manner, the user of the identity consumer computing service 118a is authenticated by an identity provider computing service 118b or 118c without the consumer service having access to the credential information. In embodiments where the authentication mechanism utilizes a Uniform Resource Locator (URL), the redirection mechanism may add user account information to the requesting URL and a success or failure code to the responder URL.

Having signed in the identity consumer computing service 118a using an identity credential (here, a Google® credential), the end user then interacts with the service in order to accomplish some site-specific task. In this example use case scenario, the user interacts with the "Cat Pics" web site to view and post photos of cats. In accessing the cat photos on behalf of the end user, the identity consumer computing service 118a may require access to a resource managed by another computing service 118. For example, the end user may upload photos from his Google® account. Such access is authenticated by the selected identity consumer computing service 118a, with the federated identity broker 127 acting as a middleman between the "Cat Pics" web site" and the Google® account service.

With the federated identity broker 127 acting as a middleman or proxy, customers of the "Cat Pics" identity consumer computing service 118a can choose to interact with the site through a variety of user account types. Furthermore, the developer of the computing service 118 is not required to add specific support for these credential types, but instead gains access to the multiple-provider feature simply by being a customer of the federated identity broker 127. The federated identity broker 127 thus allows two different computing services 118 to interoperate without a pre-existing relationship.

As another use case scenario, the end user may utilize another type of computing service 118, for example, a network-based storage service such as Amazon® S3. The end user may have various files stored at the storage service, such as music, video, photos, documents, etc. In order to print photos stored at the network-based storage service, the end user may utilize the services of another type of computing service 118, a photo printing service (known as "QuickPic"). Both the network-based storage computing service 118a and the photo printing computing service 118b are registered customers of the federated identity broker 127.

In this scenario, the end user first signs in to the QuickPic web site using his network-based storage service credentials. The end user then interacts with QuickPic to choose which photos to print, and indicates that he would like to print photos that are stored in his network-based storage service drop box. The QuickPic computing service 118 sends a request to the federated identity broker 127 for access to the network-based storage service account. The federated identity broker 127 contacts the network-based storage service 118 on behalf of QuickPic, which is in turn acting on behalf of the end user. The user's network-based storage service credentials are used to grant QuickPic transitive access to retrieve pictures from the user's network-based storage service drop box.

In some embodiments, the federated identity broker 127 may grant QuickPic access to the entire drop box. In other embodiments, the federated identity broker 127 may scope the permission so that QuickPic only has access to selected resources or selected portions of a resource, for example, a particular network-based storage bucket. In some embodiments, the federated identity broker 127 may scope the permission so that QuickPic only has a particular type of access to a network-based storage bucket. In the context of data access, these types of access may include read or write, but other types of access may be appropriate in other contexts. In order to provide scoping, the federated identity broker 127 may provide an interface which allows the user to set permission levels for various resources. Thus, the user may allow QuickPic access to one network-based storage bucket while allowing another computing service 118, such as a network-based music player, access to a different network-based storage bucket.

Figure 2:
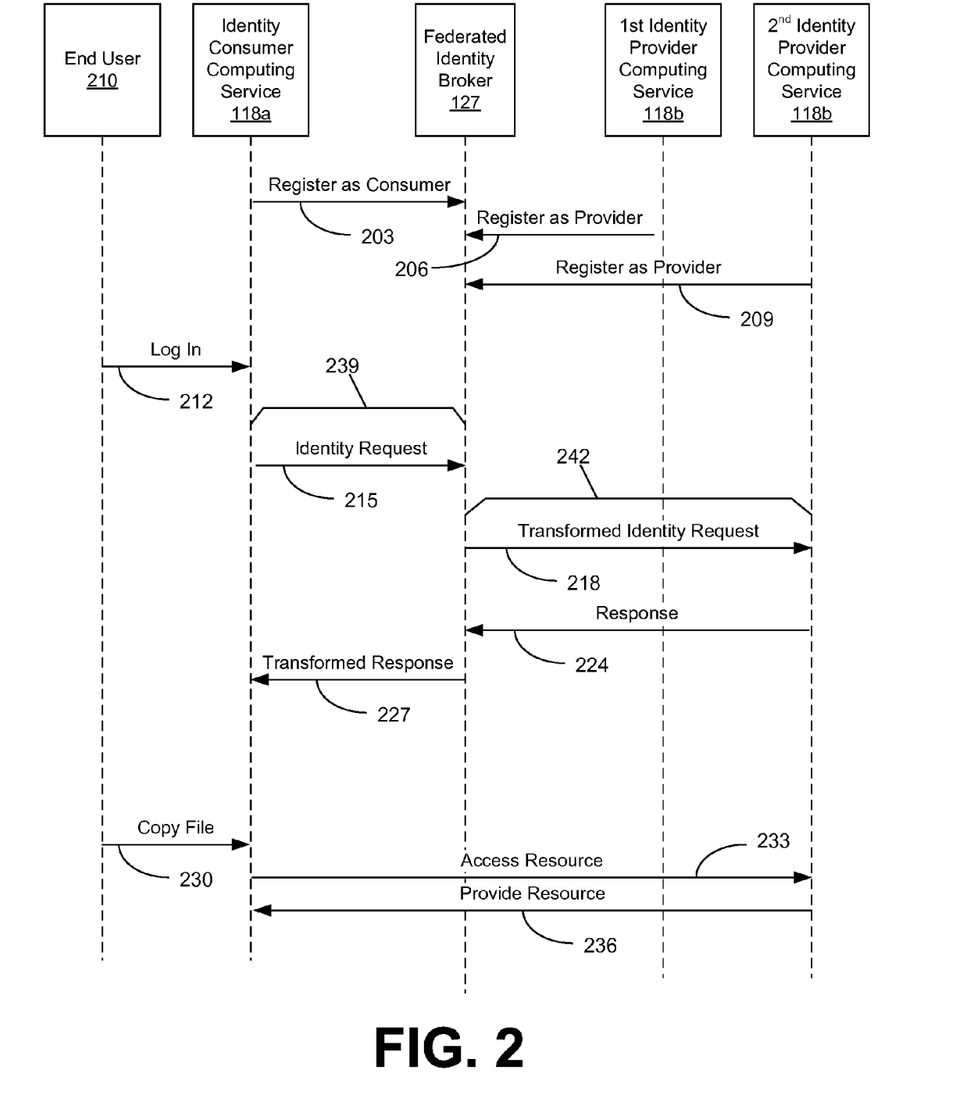
FIG. 2 is a messaging diagram illustrating various interactions between some of the components in the networked environment of FIG. 1 according to various embodiments of the present disclosure.

Moving on to FIG. 2, shown is a messaging diagram illustrating one example of the operation of portion(s) of the federated identity broker 127 according to various embodiments. It is understood that the block diagram of FIG. 2 provides merely an example of the types of inputs which may be employed to implement the operation of portion(s) of the federated identity broker 127 as described herein. In this use case, an end user interacting with the photo sharing service "QuickPic" desires access to a resource owned by a network-based storage service such as Amazon® S3. Before accessing a resource, a service first asks for authentication of the identity of the requesting user. Thus, Quick Pic acts in the role of an identity consumer and is thus represented in FIG. 2 as identity consumer computing service 118a. Similarly, in order to grant access to a resource, a service authenticates that identity. Thus, the network-based storage service acts in the role of an identity provider, and is therefore represented in FIG. 2 as identity provider computing service 118c.

However, before identity consumers and identity providers can interact through the federated identity broker 127, these services first register with the federated identity broker 127. As shown in FIG. 2, the identity consumer computing service 118a registers at block with 203 with the federated identity broker 127 in the role of an identity consumer. At block 206, the identity provider computing service 118b registers with the federated identity broker 127 in the role of an identity provider. Next, at block 209, the identity provider computing service 118c also registers with the federated identity broker 127 in the role of an identity provider. It should be noted that although FIG. 2 depicts the services registering in a particular order, other registration sequences are possible.

After this registration process, all of the computing services are customers of, and thus have a pre-existing relationship with, the federated identity broker 127. However, identity providers and identity consumers are not required to have pre-existing relationships with each other. Instead, the federated identity broker 127 acts as the intermediary between the two.

Continuing with the use case involving the hypothetical Quick Pics service and a network-based storage service, an end user 210 logs in to the Quick Pics site at block 212. This results in the Quick Pics identity consumer computing service 118a sending an identity request to the federated identity broker 127 at block 215. The federated identity broker 127 examines the request, determines which of the registered identity providers satisfies the identity assertions in the request, and generates a new identity request. The new identity request is based on the received identity request, but may transform one or more of the assertions in the request in order to match the selected identity provider.

In the scenario shown in FIG. 2, the federated identity broker 127 has selected an identity provider used by a network-based storage service as the identity provider to handle the request. Therefore, at block 218 the federated identity broker 127 sends the transformed request on to the network-based storage service identity provider computing service 118c. The network-based storage service identity provider computing service 118c fulfills the identity request at block 224 by issuing a response that either grants or denies access to the resource in the request based on the identity, and based on assertions in the request received from the federated identity broker 127. The federated identity broker 127 receives the response and generates a new identity response. The new identity response is based on the received identity response, but may transform one or more of the assertions in the response in order to match the identity consumer. At block 227, the federated identity broker 127 sends the transformed identity response to the Cat Pics identity consumer computing service 118a.

In the scenario shown in FIG. 2, the response received by the Cat Pics identity consumer computing service 118a indicates that the identity request is granted. The Quick Pics identity consumer computing service 118a can then access resources located at the network-based storage service identity provider computing service 118c without the aid of the federated identity broker 127. At block 230, the end user interacts with the Quick Pics site to copy a photo stored at the network-based storage service over to the Quick Pics site. At block 233, the Quick Pics identity consumer computing service 118a sends a resource access message to the network-based storage service identity provider computing service 118c. The message specifies the resource to which access was granted in the earlier identity transaction. The network-based storage service identity provider computing service 118c provides the resource at block 236. In this manner, the end user can interact with one service provider to access resources stored in an account at another service provider, without logging in to both accounts.

The federated identity broker 127 is thus involved in two authorization flows, an inbound flow 239 and an outbound flow 242. The federated identity broker 127 acts as an identity provider in the inbound flow 239, and as an identity consumer in the outbound flow 242. In some embodiments, the flows processed by the federated identity broker 127 are implemented using one of the OAuth protocols, such as OAuth 1.0, described in Request for Comment (RFC) 5849, or OAuth 2.0 (in draft RFC form at the time of filing). However, other authorization, authentication, and security related protocols are also possible as can be appreciated.

From the viewpoint of each of the computing services 118a, c the federated identity broker 127 is a flow endpoint, and the computing services 118a, c are not aware of each other's existence. By acting as a middleman or back-to-back proxy, the federated identity broker 127 can mediate between the computing service 118a and the computing service 118c. In this manner, the federated identity broker 127 enables access to the particular service provided by the computing service 118c for users of the other service, computing service 118a, and vice versa. Because the federated identity broker 127 acts as a middleman, the federated identity broker 127 can provide, in a generic manner, scoping services which allows an end user to dynamically adjust the portion of a resource that is delegated to a particular computing service 118.

Figure 3:
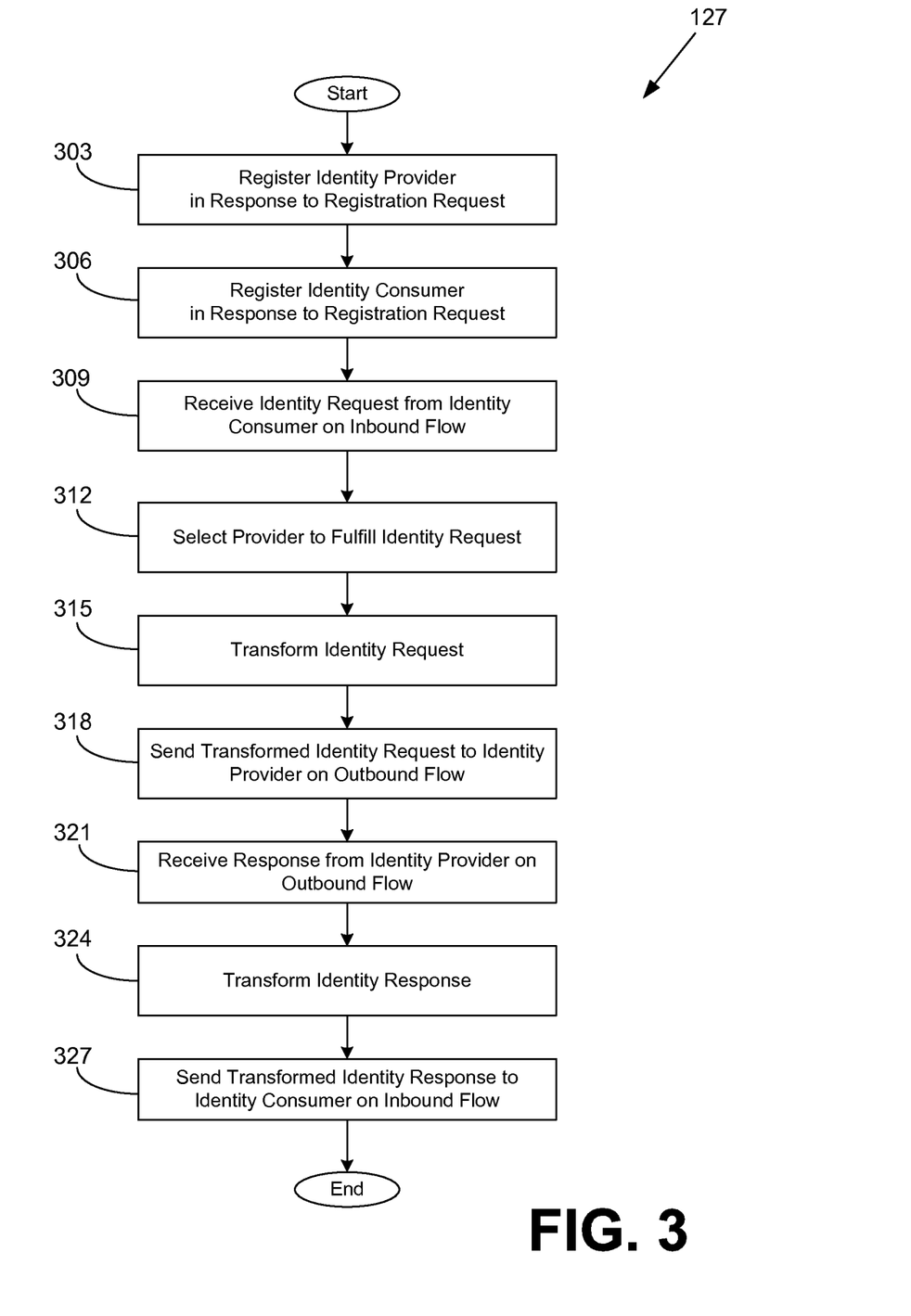
FIG. 3 is a flowchart illustrating an example of functionality implemented as portions of a federated identity broker application executed in a computing device in the networked environment of FIG. 1 according to various embodiments of the present disclosure.

With reference now to FIG. 3, shown is a flowchart that provides one example of the operation of portion(s) of the federated identity broker 127 according to various embodiments. It is understood that the flowchart of FIG. 3 provides merely an example of the many different types of functional arrangements that may be employed to implement the operation of portion(s) of the federated identity broker 127 as described herein. As an alternative, the flowchart of FIG. 3 may be viewed as depicting an example of steps of a method implemented in the computing device 109 (FIG. 1) according to one or more embodiments.

Beginning at box 303, the federated identity broker 127 receives a registration request from a customer acting in the role of an identity provider and registers the customer as an identity provider in accordance with the request. The request may include information describing the customer and its identity provider characteristics. The registration may involve storing some or all of the identity provider characteristics in the data store 130. The federated identity broker 127 also maintains a list of all registered identity providers. Next, at box 306, the federated identity broker 127 receives a registration request from another customer acting in the role of an identity consumer and registers the customer as an identity consumer in accordance with the request. The request may include information describing the customer and its identity consumer characteristics. The registration may involve storing some or all of the identity consumer characteristics in the data store 130.

Though the term "customer" is used to describe the relationship between the federated identity broker 127 and various identity providers and consumers, this term does not imply that the providers and consumers must pay the federated identity broker 127. Instead, the term "customer" merely indicates that the federated identity broker 127 is providing services on behalf of these parties.

Having registered at least one identity provider and at least one identity consumer, the federated identity broker 127 acts as an intermediary between the first customer and the second customer, as follows. At box 309, the federated identity broker 127 receives an identity request from the first customer (the identity consumer). This request is received on an inbound flow, from the point of view of the federated identity broker 127. Next, at box 312, the federated identity broker 127 selects one identity provider from among multiple registered identity providers. The selected identity consumer will later fulfill the consumer's identity request that was received at box 309.

As described above, the federated identity broker 127 may use a variety of approaches to choose an identity provider. For example, the federated identity broker 127 may choose a particular identity provider by name or by identifier based on input from the identity consumer during the consumer registration process. Alternatively, the federated identity broker 127 may choose an identity provider based on an identity standard and/or level of assurance specified by the identity consumer during the consumer registration process (e.g., NIST 800.63 Level 3). As yet another alternative, the federated identity broker 127 may choose an identity provider based on a selection criteria provided by the identity consumer during the consumer registration process (e.g., ISO 27001 audit compliant). In any of these embodiments in which the identity consumer provides the federated identity broker 127 with instructions or guidance (e.g., such as an indication that the user has an account with a particular identity provider) in choosing an identity provider, the identity consumer may use input that is directly elicited from the end user or may use configuration data that is derived from end user input.

At box 315, the federated identity broker 127 examines the identity request received at box 303 and transforms assertions in the identity request as appropriate so that the request will be acceptable to the identity provider selected at box 309. The transformation may utilize provider-specific information stored previously in the data store 130. The transformation at box 315 may also modify permissions associated with the identity request. Such permissions may be included in the identity request itself, or may be retrieved via a separate message or messaging transaction. The determinations of whether to modify permissions and in what manners the permission are modified may be based on the permission data 133 stored previously in the data store 130. The federated identity broker 127 may configure and maintain the permission data 133 based on information obtained from the end user on whose behalf the identity request is made. This allows the end user to specify various permissions for particular resources, (e.g., network-based computing storage, an electronic mailbox, or an electronic drop box) that are owned by the end user.

At box 318, the federated identity broker 127 sends the transformed request to the second customer (the identity customer). This request is based on the identity request received at box 309, though it may have been modified at box 315. This request is sent on a separate flow, which is an outbound flow from the point of view of the federated identity broker 127. Next, at box 321, the federated identity broker 127 receives a response to the identity request from the second customer (the identity provider), on the outbound flow. At box 324, the federated identity broker 127 examines the identity response received at box 321 and transforms assertions in the identity response as appropriate so that the response will be acceptable to the identity consumer. Next, at box 327, the federated identity broker 127 sends the transformed response to the first customer (the identity consumer) on the outbound flow. Thus, the federated identity broker 127 brokers an identity request from the first customer that is fulfilled by the second customer. The process of FIG. 3 is then complete. Though not shown in FIG. 3, the identity consumer and the identity provider continue to communicate in order to access protected resources that are authenticated by the provider.

Figure 4:
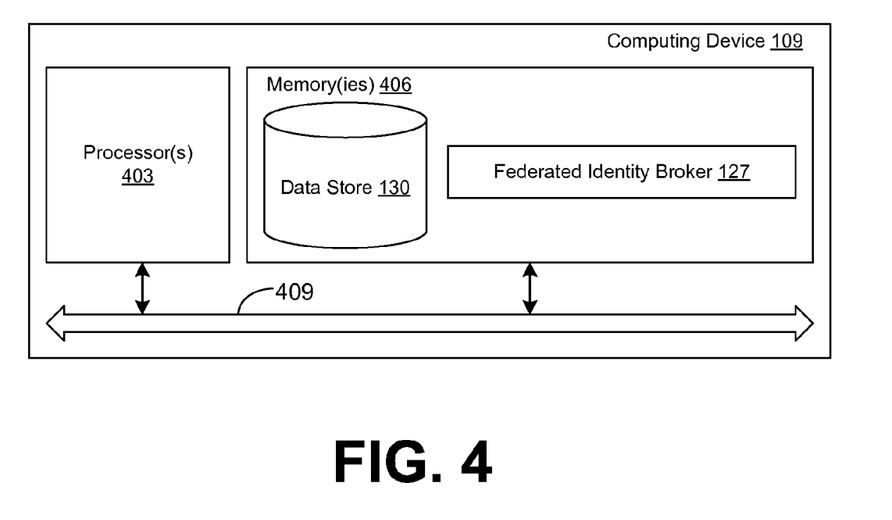
FIG. 4 is a schematic block diagram that provides one example illustration of a computing device employed in the networked environment of FIG. 1 according to various embodiments of the present disclosure.

With reference now to FIG. 4, shown is a schematic block diagram of the client device 112 according to an embodiment of the present disclosure. The computing device 109 includes at least one processor circuit, for example, having a processor 403 and a memory 406, both of which are coupled to a local interface 409. To this end, the computing device 109 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the federated identity broker 127 and potentially other applications. In addition, an operating system may be stored in the processor 403 and executable by the processor 403. While not illustrated, the computing device 109 (FIG. 1) also includes components like those shown in FIG. 4, whereby the browser 136 (FIG. 1) is stored in a memory and executable by a processor.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and executed by the processor 403, source code that may be expressed in proper format such as object code that is capable of being loaded into a random access portion of the memory 406 and executed by the processor 403, or source code that may be interpreted by another executable program to generate instructions in a random access portion of the memory 406 and executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network 115 (FIG. 1) that facilitates communication between any two of the multiple processors 403, between any of the processors 403 and any of the memories 406, or between any two of the memories 406, etc. The local interface 409 may comprise additional systems designed to coordinate this communication, including, for example, performing load balancing. The processor 403 may be of electrical or of some other available construction.

Although the federated identity broker 127 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the federated identity broker 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in the flowchart of FIG. 3 may be executed concurrently or with partial concurrence. Further, in some embodiments, one or more of the blocks shown in the flowchart of FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the federated identity broker 127) that comprises software or code can be embodied in any non-transitory computer-readable medium for use by or in connection with an instruction execution system such as, for example, the processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:
1. A method, comprising:
registering, by a federated identity broker application executing on one or more computing devices, a first customer as an identity provider;
registering, by the federated identity broker application, a second customer as an identity consumer;
supplying to the second customer a set of registered identity providers that have registered with the federated identity broker application, the set identifying at least the first customer as a trusted provider; and acting as an intermediary between the first customer and the second customer to broker an identity request from the second customer that is granted or denied by the first customer by:
receiving, by the federated identity broker application, the identity request from the second customer in an inbound flow;
changing, by the federated identity broker application, a permission associated with the identity request;
generating, by the federated identity broker application, a broker identity request using at least information associated with the identity request and including the changed permission; and
transmitting, by the federated identity broker application, the broker identity request, including the changed permission, to the first customer on a separate outbound flow.

2. The method of claim 1, wherein the permission describes access to a resource authenticated by the second customer.

3. The method of claim 2, wherein the permission is at least a read access permission or a write access permission.

4. The method of claim 1, wherein the permission grants access to at least of a plurality of resources accessible by the first customer.

5. The method of claim 1, wherein the first customer and the second customer have no predefined identity consumer-provider relationship.

6. The method of claim 1, further comprising supplying to the second customer a set of registered identity providers that have registered with the federated identity broker application, the set identifying at least the first customer as a trusted provider.

7. The method of claim 6, further comprising receiving, from the second customer, a selection of the first customer as the trusted provider.

8. A system, comprising:
at least one computing device; and
the at least one computing device executing a federated identity broker application, the federated identity broker application comprising:
logic that registers a first customer as an identity provider on request by the first customer;
logic that registers a second customer as an identity consumer on request by the second customer;
logic that receives a first identity request from the second customer on an inbound flow;
logic that generates a changed permission associated with the first identity request;
logic that generates a broker identity request using at least information associated with the first identity request and including the changed permission;
logic that sends the broker identity request to the first customer on an outbound flow separate from the inbound flow, brokering the first identity request from the second customer that is granted or denied by the first customer; and
logic that requests an end user of the first customer to approve the first identity request, wherein the logic that sends the broker identity request to the first customer on the outbound flow is conditional upon approval by the end user.

9. The system of claim 8, wherein the broker identity request is implemented using an OAuth protocol.

10. The system of claim 8, wherein the federated identity broker application further comprises logic that modifies the first identity request to produce the broker identity request.

11. The system of claim 8, wherein the federated identity broker application further comprises logic that receives a second identity request from an end user of the first customer.

12. The system of claim 8, wherein the federated identity broker application further comprises:
logic that receives a first response to the broker identity request from the first customer; and
logic that sends a second response to the second customer, the second response based at least in part on the first response.

13. The system of claim 12, wherein the first response is selected from the group consisting of a grant and a deny.

14. A non-transitory computer readable medium embodying a program executable by at least one computing device the program configured to cause the at least one computing device to at least:
registering, by a federated identity broker application executing on the at least one computing device, a first customer as an identity provider;
registering, by the federated identity broker application, a second customer as an identity consumer;
supplying, by the federated identity broker application, to the second customer a set of registered identity providers that have registered with the federated identity broker application, the set identifying at least the first customer as a trusted provider; and
acting as an intermediary between the first customer and the second customer to broker an identity request from the second customer that is granted or denied by the first customer by:
receiving, by the federated identity broker application, the identity request from the second customer in an inbound flow;
changing, by the federated identity broker application, a permission associated with the identity request;
generating, by the federated identity broker application, a broker identity request using at least information associated with the identity request and including the changed permission; and
transmitting, by the federated identity broker application, the broker identity request, including the changed permission, to the first customer on a separate outbound flow.

15. The non-transitory computer readable medium of claim 14, wherein the permission describes access to a resource authenticated by the second customer.

16. The non-transitory computer readable medium of claim 14, wherein the permission is at least a read access permission or a write access permission.

* * * * *